(12) United States Patent
Huang et al.

(10) Patent No.: US 7,092,778 B2
(45) Date of Patent: Aug. 15, 2006

(54) FABRICATION MANAGEMENT SYSTEMS AND METHODS

(75) Inventors: Chen-Chu Huang, Pingjhen (TW); Yu-Chen Ting, Jhubei (TW); Howard C. H. Lee, Taipei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 9 days.

(21) Appl. No.: 11/005,131

(22) Filed: Dec. 6, 2004

(65) Prior Publication Data

US 2006/0122722 A1 Jun. 8, 2006

(51) Int. Cl.
*G06F 19/00* (2006.01)
*G06F 7/00* (2006.01)
*G06F 17/30* (2006.01)
*G06F 17/21* (2006.01)
*G06F 17/24* (2006.01)
*G06F 3/00* (2006.01)
*G05B 11/01* (2006.01)

(52) U.S. Cl. .................... 700/105; 700/15; 700/16; 707/6; 707/10; 707/104.1; 715/505; 715/808; 715/809

(58) Field of Classification Search ............. 700/11, 700/12, 14–16, 95, 97, 105; 705/1, 7, 26; 707/1, 3–6, 9, 10, 104.1, 200, 201; 715/500, 715/764, 808, 809
See application file for complete search history.

(56) References Cited

U.S. PATENT DOCUMENTS 6,480,955 B1 * 11/2002 DeKoning et al. .......... 713/100
6,539,386 B1 * 3/2003 Athavale et al. ............. 707/10
6,721,746 B1 * 4/2004 Zulpa et al. .................. 707/10
6,772,028 B1 * 8/2004 Yen et al. ..................... 700/99
6,859,821 B1 * 2/2005 Ozzie et al. ................ 709/205
6,996,601 B1 * 2/2006 Smith ......................... 709/203
2002/0042755 A1 * 4/2002 Kumar et al. ................ 705/26
2002/0128890 A1 * 9/2002 Dick et al. .................... 705/8
2002/0152133 A1 * 10/2002 King et al. .................. 705/26
2003/0018537 A1 * 1/2003 Tomita et al. ............... 705/26
2003/0195811 A1 * 10/2003 Hayes et al. ................ 705/26
2004/0019634 A1 * 1/2004 Van Geldern et al. ..... 709/203
2004/0098382 A1 * 5/2004 Chuang et al. ............... 707/3
2004/0225541 A1 * 11/2004 Porter et al. .................. 705/7
2005/0015265 A1 * 1/2005 Price .......................... 705/1
2005/0235035 A1 * 10/2005 Benejam et al. ........... 709/206

FOREIGN PATENT DOCUMENTS

TW 591453 6/2004

OTHER PUBLICATIONS

Taiwan Patent Office Action.

* cited by examiner

*Primary Examiner*—Crystal J. Barnes
(74) *Attorney, Agent, or Firm*—Thomas, Kayden, Horstemeyer & Risley

(57) ABSTRACT

Systems and methods for semiconductor fabrication management. A processing unit receives an engineering change request (ECR) comprising information regarding new engineering for a wafer lot, generates an ECR reminder comprising information regarding the ECR request, transmits the ECR reminder to a client operator through a communication device, receives a reply corresponding to the ECR reminder, determines a reply result indicating whether the ECR is accepted by detecting the reply, and transmits the reply result to a manufacturing execution system (MES).

16 Claims, 15 Drawing Sheets

Dear customers,

This message is to inform you that there is a [TSMC-ECR.significance level] engineering change case which requires your review and approval. Please find the detail below:
ECR No.:[TSMC-ECR.ECR Identity] ~43b
Change Class:[TSMC-ECR.Significance level] ~43c
Technology Affected:[TSMC-ECR.Impact Technology] ~43d
Affected Area:[TSMC-ECR.Impact Fab] ~43e
Document No.:[TSMC-ECR.Document Number] ~43f
Document Title:[TSMC-ECR.Document Title] ~43g
Customer Name:[Account Name] ~43h
Customer Code:[TSMC-ECR.Owner Identity] ~43i
Change Purpose:[TSMC-ECR.Detail description] ~43j
Attachment:[Attachment Name] ~43k
Date of First Reminder:[System.Now] ~43l
TSMC Contact CE:[CE List] ~43m
In order to ensure prompt and accurate process, please provide your response in the feedback area near the bottom of the message and reply to the email directly.

~43a (at top)

FIG. 4A

This change will not be implemented without your consensus. However, if we do not receive your reply before [TSMC-ECR.Due date], [Remain Date] days from this notice, TSMC will apply the change to your products.
Please fell free to contact TSMC service person if you have further questions.
Thanks,
TSMC Document Center

** Begin of your feedback {SR Id:[TSMC-ECR.ECR identity]} {Accnt Id:[TSMC-ECR.Owner Identity]} **
1. Do you agree to the change? (Y/N):
2. Your Comments:
** End of your feedback **

FIG. 4B

Dear customers,

This message is to inform you that there is a [TSMC-ECR.significance level] engineering change case which requires your review and approval. Please find the detail below:

ECR No.:[TSMC-ECR.ECR Identity] ~53b
Change Class:[TSMC-ECR.Significance level] ~53c
Technology Affected:[TSMC-ECR.Impact Technology] ~53d
Affected Area:[TSMC-ECR.Impact Fab] ~53e
Document No.:[TSMC-ECR.Document Number] ~53f
Document Title:[TSMC-ECR.Document Title] ~53g
Customer Name:[Account Name] ~53h
Customer Code:[TSMC-ECR.Owner Identity] ~53i
Change Purpose:[TSMC-ECR.Detail description] ~53j
Attachment:[Attachment Name] ~53k
Date of Second Reminder:[System.Now] ~53l
TSMC Contact CE:[CE List] ~53m
In order to ensure prompt and accurate process, please provide your response in the feedback area near the bottom of the message and reply to the email directly.

53a (above greeting area); 51 (enclosing frame)

FIG. 5A

| FIG. 5A |
| FIG. 5B |

This change will not be implemented without your consensus. However, if we do not receive your reply before [TSMC-ECR.Due date], [Remain Date] days from this notice, TSMC will apply the change to your products.
Please fell free to contact TSMC service person if you have further questions.
Thanks,
TSMC Document Center

** Begin of your feedback {SR Id:[TSMC-ECR.ECR_identity]} {Acnt Id:[TSMC-ECR.Owner Identity]} **
1. Do you agree to the change? (Y/N):
2. Your Comments:
** End of your feedback **

FIG. 5B

Dear customers,

This message is to inform you that there is a [TSMC-ECR.significance level] engineering change case which requires your review and approval. Please find the detail below:
ECR No.:[TSMC-ECR.ECR Identity]—63a
Change Class:[TSMC-ECR.Significance level]—63b
Technology Affected:[TSMC-ECR.Impact Technology]—63c
Affected Area:[TSMC-ECR.Impact Fab]—63d
Document No.:[TSMC-ECR.Document Number]—63e
Document Title:[TSMC-ECR.Document Title]—63f
Customer Name:[Account Name]—63g
Customer Code:[TSMC-ECR.Owner Identity]—63h
Change Purpose:[TSMC-ECR.Detail description]—63i
Attachment:[Attachment Name]—63j
Date of Final Reminder:[System.Now]—63k
TSMC Contact CE:[CE List]—63m
In order to ensure prompt and accurate process, please provide your response in the feedback area near the bottom of the message and reply to the email directly.

FIG. 6A

This change will not be implemented without your consensus. However, if we do not receive your reply before [TSMC-ECR.Due date], [Remain Date] days from this notice, TSMC will apply the change to your products. ⌐63n   ⌐63o
Please fell free to contact TSMC service person if you have further questions.
Thanks,
TSMC Document Center

** Begin of your feedback {SR Id:[TSMC-ECR.ECR_identity]} {Accnt Id:[TSMC-ECR.Owner Identity]} **   ⌐63p   ⌐63q
1. Do you agree to the change? (Y/N):
2. Your Comments:
** End of your feedback **

FIG. 6B

Dear customers,

We are glad to inform you that TSMC Engineering Change Notice [TSMC-ECR.ECR identity] is effective now. ~71a Brief information for [TSMC-ECR.ECR identity]: ~71b
    Change Purpose:[TSMC-ECR.Detail description] ~71c
    Change Class:[TSMC-ECR.Significance level] ~71d
    Impact TSMC FAB:[TSMC-ECR.Impact Fab] ~71e
    Effective Date:[TSMC-ECR.Deu date] ~71f
    Document:[TSMC-ECR.Document Number] ~71g If you have any questions or need help, please contact TSMC service accounts at any time.
Thanks!

FIG. 7

FABRICATION MANAGEMENT SYSTEMS AND METHODS

BACKGROUND

The invention relates to fabrication management technology, and more particularly, to fabrication management methods and systems responding to engineering changes.

A conventional semiconductor factory typically includes the requisite fabrication tools to process semiconductor wafers under operations, such as photolithography, chemical-mechanical polishing, or chemical vapor deposition. During manufacturing, the semiconductor wafer passes through a series of process steps, which are performed by various fabrication tools. For example, in the production of an integrated semiconductor product, the semiconductor wafer passes through up to 600 process steps. Costs for such automated production are influenced to a great extent by the question as to how well and efficiently the manufacturing process can be monitored or controlled, so that the ratio of defect-free products to the overall number of products manufactured (i.e., yield ratio) achieves as great a value as possible.

Changes in process flow, operating recipes, or others, may improve yield during semiconductor manufacturing. These engineering changes are typically applied to specific wafer lots after confirmation from client operators. Conventionally, operators spend much time communicating various engineering changes to relevant clients, and even more time managing responses thereto. This labor-intensive management method severely hinders efficiency.

SUMMARY

Systems for semiconductor fabrication management are provided. An exemplary embodiment comprises a communication device and a processing unit. The processing unit receives an engineering change request (ECR) comprising information regarding new engineering for a wafer lot, generates an ECR reminder comprising information regarding the ECR request, transmits the ECR reminder to a client operator through the communication device, receives a reply mail corresponding to the ECR reminder, determines a reply result indicating whether the ECR is accepted by detecting the reply mail, and transmits the reply result to a manufacturing execution system (MES). Thus, the MES directs at least one fabrication tool to apply the new engineering on the wafer lot.

Semiconductor fabrication management methods are further provided. An exemplary method receives an engineering change request (ECR) comprising information regarding new engineering for a wafer lot, generates an ECR reminder comprising information regarding the ECR request, transmits the ECR reminder to a client operator through the communication device, receives a reply corresponding to the ECR reminder, determines a reply result indicating whether the ECR is accepted by detecting the reply, and transmits the reply result to a manufacturing execution system (MES). Fabrication of at least one semiconductor device in a wafer lot utilizes the disclosed method.

A machine-readable storage medium storing a computer program which, when executed, performs the method of semiconductor fabrication management is also disclosed.

DESCRIPTION OF THE DRAWINGS

Semiconductor fabrication management systems and methods will become apparent by referring to the following detailed description with reference to the accompanying drawings, wherein:

FIGS. 4a and 4b are diagrams of an exemplary first reminder template;

FIGS. 5a and 5b are diagrams of an exemplary second reminder template;

FIGS. 6a and 6b are diagrams of an exemplary final reminder template;

FIG. 7 is a diagram of an exemplary engineering change notice template;

DESCRIPTION

Figure 1:
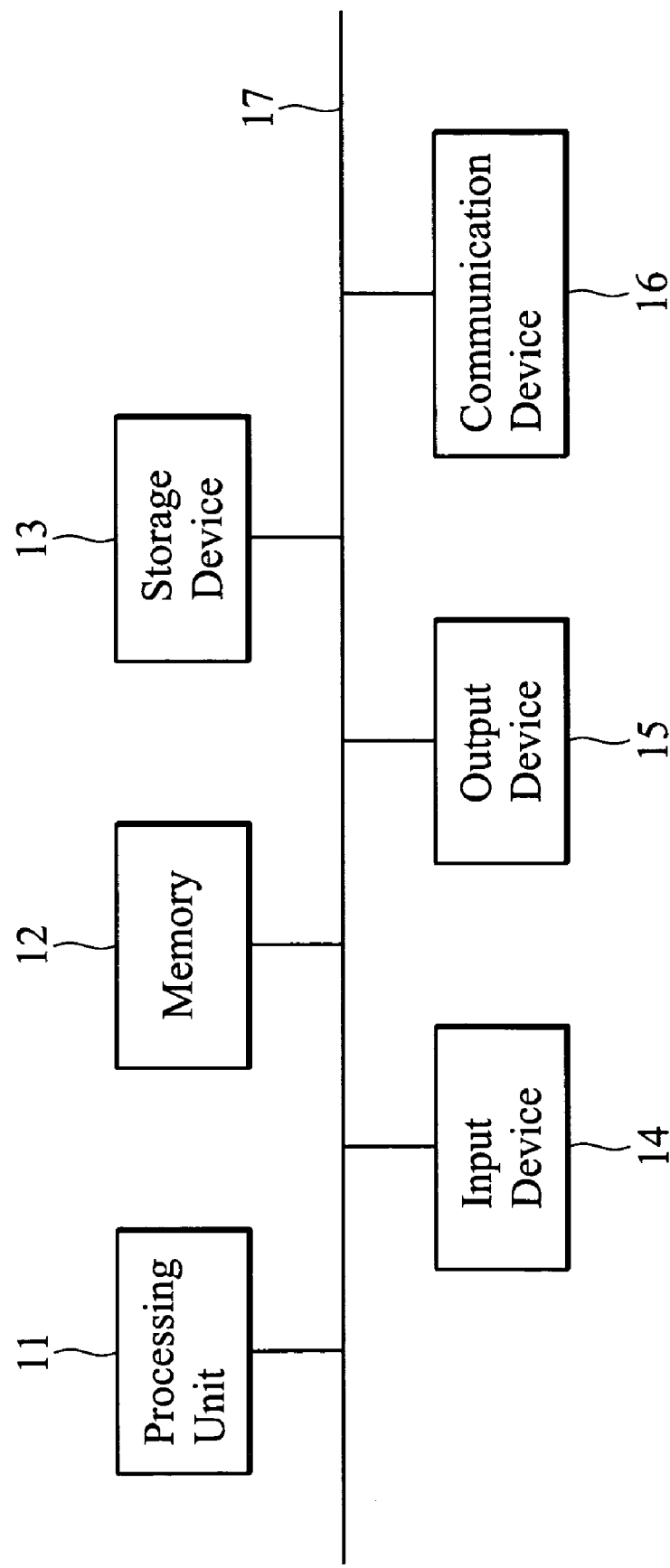
FIG. 1 is a diagram of a hardware environment applicable to computers in an embodiment of an fabrication management system.

FIG. 1 is a diagram of a hardware environment applicable to computers in an embodiment of an fabrication management system, comprising a processing unit 11, a memory 12, a storage device 13, an input device 14, an output device 15 and a communication device 16. The processing unit 11 is connected by buses 17 to the memory 12, storage device 13, input device 14, output device 15 and communication device 16 based on Von Neumann architecture. There may be one or more processing units 11, such that the processor of the computer comprises a single central processing unit (CPU), a microprocessing unit (MPU) or multiple processing units, commonly referred to as a parallel processing environment. The memory 12 is preferably a random access memory (RAM), but may also include read-only memory (ROM) or flash ROM. The memory 12 preferably stores program modules executed by the processing unit 11 to perform data archiving management functions. Generally, program modules include routines, programs, objects, components, or others, that perform particular tasks or implement particular abstract data types. Moreover, those skilled in the art will understand that at least some embodiments may be practiced with other computer system configurations, including hand-held devices, multiprocessor-based, microprocessor-based or programmable consumer electronics, network PCs, mini-computers, mainframe computers, and the like. Some embodiments may also be practiced in distributed computing environments where tasks are performed by remote processing devices linked through a communication network. In a distributed computing environment, program modules may be located in both local and remote memory storage devices based on various remote access architecture such as DCOM, CORBA, Web objects, Web Services or other similar architectures. The storage device 13 may be a hard drive, magnetic drive, optical drive, a portable drive, or nonvolatile memory drive. The drives and associated computer-readable media thereof (if required) provide nonvolatile storage of computer-readable instructions, data structures, and program modules. The processing unit 11, controlled by program modules received from the memory 12 and from an operator through the input device, directs data archiving management functions. The storage device 13 may comprise a database management system, an object base management system, a file management system, or others, storing various data.

Integrated circuits are typically fabricated by processing one or more wafers as a "lot" with a series of wafer fabrication tools (i.e., "processing tools"). The fabrication tool (not shown) typically performs a single wafer fabrication operation upon the wafers in a given lot to produce semiconductor devices. For example, a particular fabrication tool may perform a layering operation, a patterning operation, a doping operation or a heat treatment upon the wafers. The wafer fabrication operation is performed according to a predefined procedure (i.e., a predetermined set of steps or "recipe").

An embodiment of the storage device 13 stores lot profile records, lot engineering records, engineering change request (ECR) records, reminder templates, and engineering change notice templates. Each lot profile record stores basic information for a specific wafer lot, preferably comprising owner identity, lot identity, part number and contact information. The owner identity corresponds to client identity or name, indicating ownership of a specific wafer lot. The part number may comprise semiconductor product type, such as RAM, CPU, ROM and the like, product number, or other, to indicate product specification. The contact information corresponds to a client operator handling a specific wafer lot. Each lot engineering record stores engineering information for a specific wafer lot, preferably comprising a processing flow, fabrication operations in the process flow and specific recipes utilized in the fabrication operations.

Each ECR record stores ECR information for one or more wafer lots, preferably comprising at least one lot identity, ECR identity, significance level, notification type, response status, valid condition, due date and detailed description of engineering change. Each ECR record associates with one or more lot profile records via the lot identity or identities. The significance level indicates impact degree for an engineering change, and may be represented by alphanumeric characters. For example, "1" or "A" represents the highest significance level, and "3" or "C" represents the lowest significance. The notification type indicates whether an engineering change requires confirmation by a client operator, and may be represented by alphanumeric characters. For example, "Y" may indicate an engineering change requires confirmation, and "N" indicates an engineering change no requirement. The response status indicates whether an ECR was replied to, the ECR was agreed and reminders corresponding to the ECR were sent. For example, "Y" indicates a client replied to an ECR and agreed the engineering change, "N" indicates a client replied to an ECR and rejected the engineering change, and "-" indicates a client did not reply to an ECR and a first reminder was not sent, "1" indicates a client did not reply to an ECR and a first reminder was sent, "2" indicates a client did not reply to an ECR and a second reminder was sent, "F" indicates a client did not reply to an ECR and a final reminder was sent. The valid condition indicates whether an ECR has been accepted or rejected if a corresponding response is absent after the due date, and may be represented by alphanumeric characters. For example, "Acc" indicates an ECR was accepted if a corresponding response is absent after the due date, and alternatively, "Rej" indicates an ECR is rejected if a corresponding response is absent after the due date. The detailed description describes new engineering, such as a new manufacturing process flow, operating recipe, or others, can be applied to a specific wafer lot. Implementation of the lot profile records, lot engineering records and ECR records described is not limited to a single table, file or data object, but also to multiple related tables, files or data objects. Consistent with the scope and spirit of the invention, additional or different content may be provided in the lot profile records, lot engineering records and ECR records.

Figure 2:
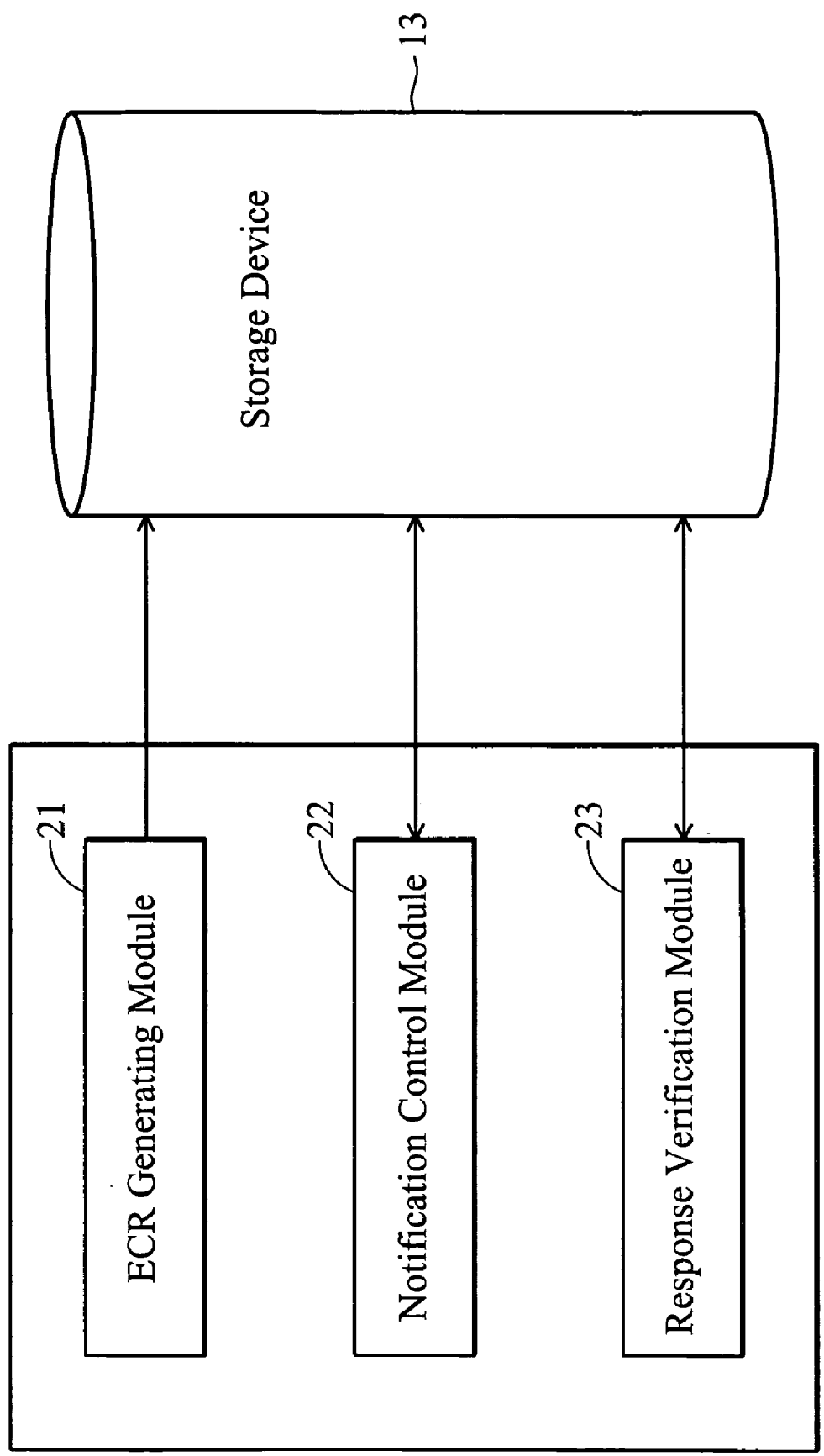
FIG. 2 is a diagram of software architecture of an embodiment of a fabrication management system.

FIG. 2 is a diagram of software architecture of an embodiment of an fabrication management system. Program modules comprising an ECR generating module 21, a notification control module 22, and a response verification module 23 are stored in the memory 12, loaded and executed by the processing unit 11.

The ECR generating module 21 may receive an ECR comprising specification of new engineering, significance level for the new engineering, affected semiconductor products, processing flows, fabrication operations or others, from a workflow management system or a graphic user interface (GUI). The ECR generating module 21 may acquire wafer lots affected by the new engineering from the storage device 13. The wafer lot may be acquired from the lot profile records and lot engineering records by issuing one or more ANSI SQL queries to a database management system, executing data object methods or file manipulation instructions. One or more ECR records corresponding to the ECR are generated for the acquired wafer lots, and stored in the storage device 13 by issuing one or more ANSI SQL queries to a database management system, executing data object methods or file manipulation instructions.

Figure 3A:
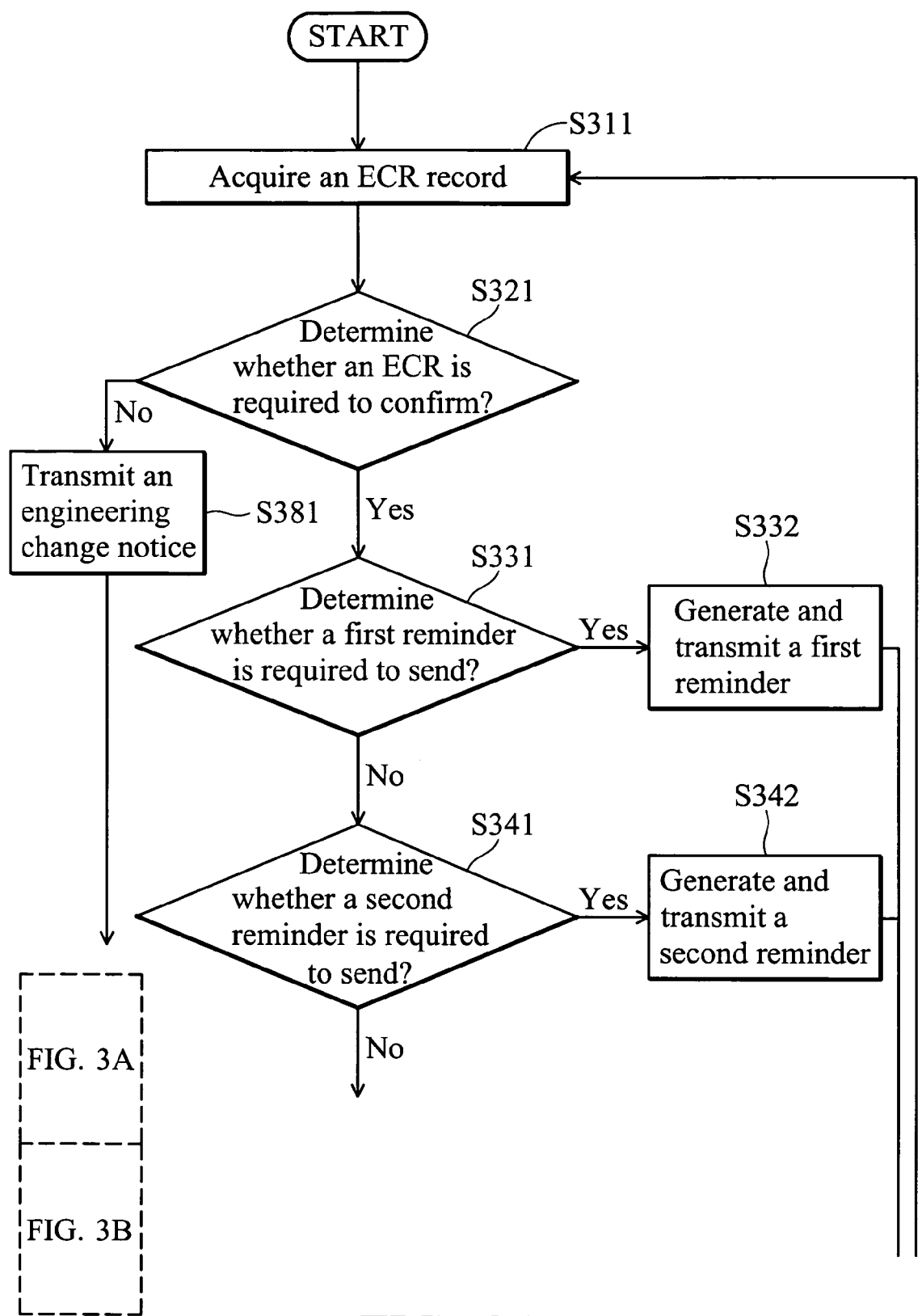
FIGS. 3a and 3b are flowcharts of an embodiment of a method for notification control.
Figure 3B:
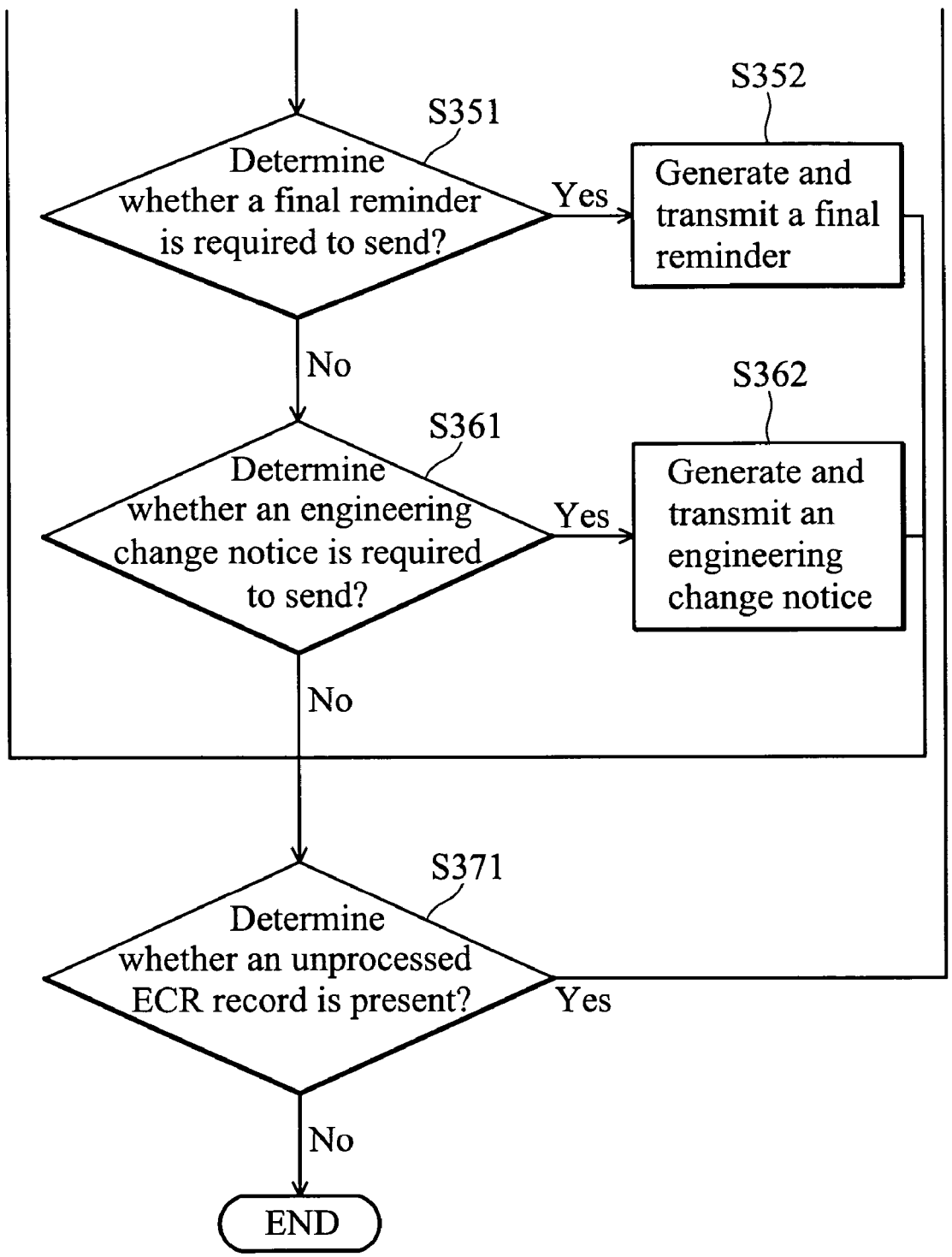

The notification control module 22 may periodically scan ECR records to generate ECR reminders, and engineering change notices to corresponding client operators through the communication device 16. Alternatively, the notification control module 22 may perform these operations when at least one new ECR record is detected. Notification control is executed by the notification control module 22. As shown in FIG. 3a, in step S311, an ECR record is acquired from the storage device 13 by one or more ANSI SQL queries to a database management system, executing data object methods or file manipulation instructions. In step S321, it is determined whether an ECR confirmation is required according to the acquired ECR record, and, if so, the process proceeds to step S331, and otherwise, to step S381. The determination may be achieved by detecting the notification type and the response status of the acquired ECR record, for example, whether the notification type is "Y" and the response status is not "Y" or "N".

In step S331, it is determined whether a first reminder is required, and, if so, the process proceeds to step S332, and otherwise, to step S341. The determination may be achieved by detecting the response status in the acquired ECR record, for example, whether the response status in the acquired ECR record is "-". In step S332, a first reminder is generated according to a first reminder template and the acquired ECR record, and transmitted to a receipt according to the corresponding lot profile record. FIGS. 4a and 4b are diagrams of an exemplary first reminder template. The first reminder template includes a notice area 41 describing engineering change details and a feedback area 42 describing feedback prompts. Relevant data of insert points 43a to 43q, quoted by square brackets, in the first reminder template is acquired from the lot profile records, lot engineering records, ECR records, system variables, or others, for the first reminder. In step S341, it is determined whether a second reminder is required, and, if so, the process proceeds to step S342, and otherwise, to step S351. The determination may be achieved by detecting whether a second reminder date, such as twenty days before the due date in the acquired ECR record, is reached. In step S342, a second reminder is generated according to a second reminder template and the acquired ECR record, and transmitted to a receipt according to the corresponding lot profile record. FIGS. 5a and 5b are diagrams of an exemplary second reminder template including a notice area 51 describing engineering change details and a feedback area 52 describing feedback prompts. Relevant data of insert points 53a to 53q, quoted by square brackets, in the second reminder template are acquired from the lot profile records, lot engineering records, ECR records, system variables, or others, for the second reminder. In step S351, it is determined whether a final reminder is required, and, if so, the process proceeds to step S352, and otherwise, to step S361. The determination may be achieved by detecting whether a final reminder date, such as five days before the due date in the acquired ECR record, is reached. In step S352, a final reminder is generated according to a final reminder template and the acquired ECR record, and transmitted to an e-mail address in the corresponding lot profile record. FIGS. 6a and 6b are diagrams of an exemplary final reminder template. The final reminder template includes a notice area 61 describing engineering change details and a feedback area 62 describing feedback prompts. Relevant data of insert points 63a to 63q, quoted by square brackets, in the final reminder template is acquired from the lot profile records, lot engineering records, ECR records, system variables, or others, for the final reminder.

In step S361, it is determined whether an engineering change notice is required, and, if so, the process proceeds to step S362, and otherwise, to step S371. The determination may be achieved by detecting response status, due date and valid condition in the acquired ECR record, for example, if response status is "F", this time exceeds the due date, and the valid condition is "Acc". In steps S362 and S381, an engineering change notice is generated according to an engineering change template and the acquired ECR record, and transmitted to a receipt according to the corresponding lot profile record. FIG. 7 is a diagram of an exemplary engineering change notice template. The engineering change notice template describes engineering change details. Relevant data of insert points 71a to 71g, quoted by square brackets, in the engineering change notice template is acquired from the lot profile records, lot engineering records, ECR records, system variables, or others, for the engineering change notice.

Figure 8:
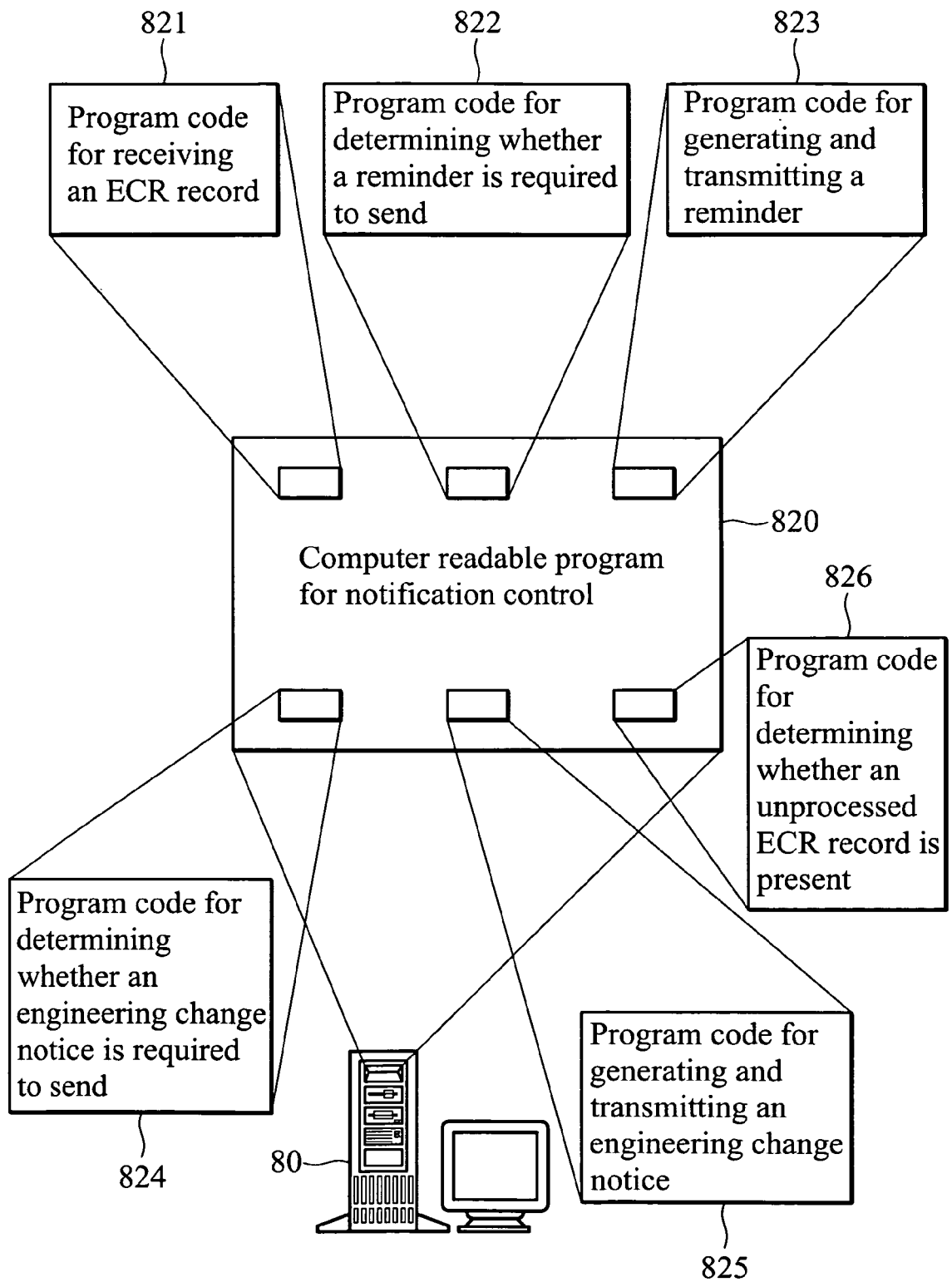
FIG. 8 is a diagram of a storage medium storing a computer program providing an embodiment of a method of notification control.

Also provided is a storage medium as shown in FIG. 8 storing a computer program 820 executing methods of notification control. The computer program product includes a storage medium 80 having computer readable program code embodied therein for use in a computer system, the computer readable program code comprising at least computer readable program code 821 receiving an ECR record, computer readable program code 822 determining whether a reminder is required, computer readable program code 823 generating and transmitting a reminder, computer readable program code 824 determining whether an engineering change notice is required, computer readable program code 825 generating and transmitting an engineering change notice and computer readable program code 826 determining whether an unprocessed ECR record is present.

Figure 9:
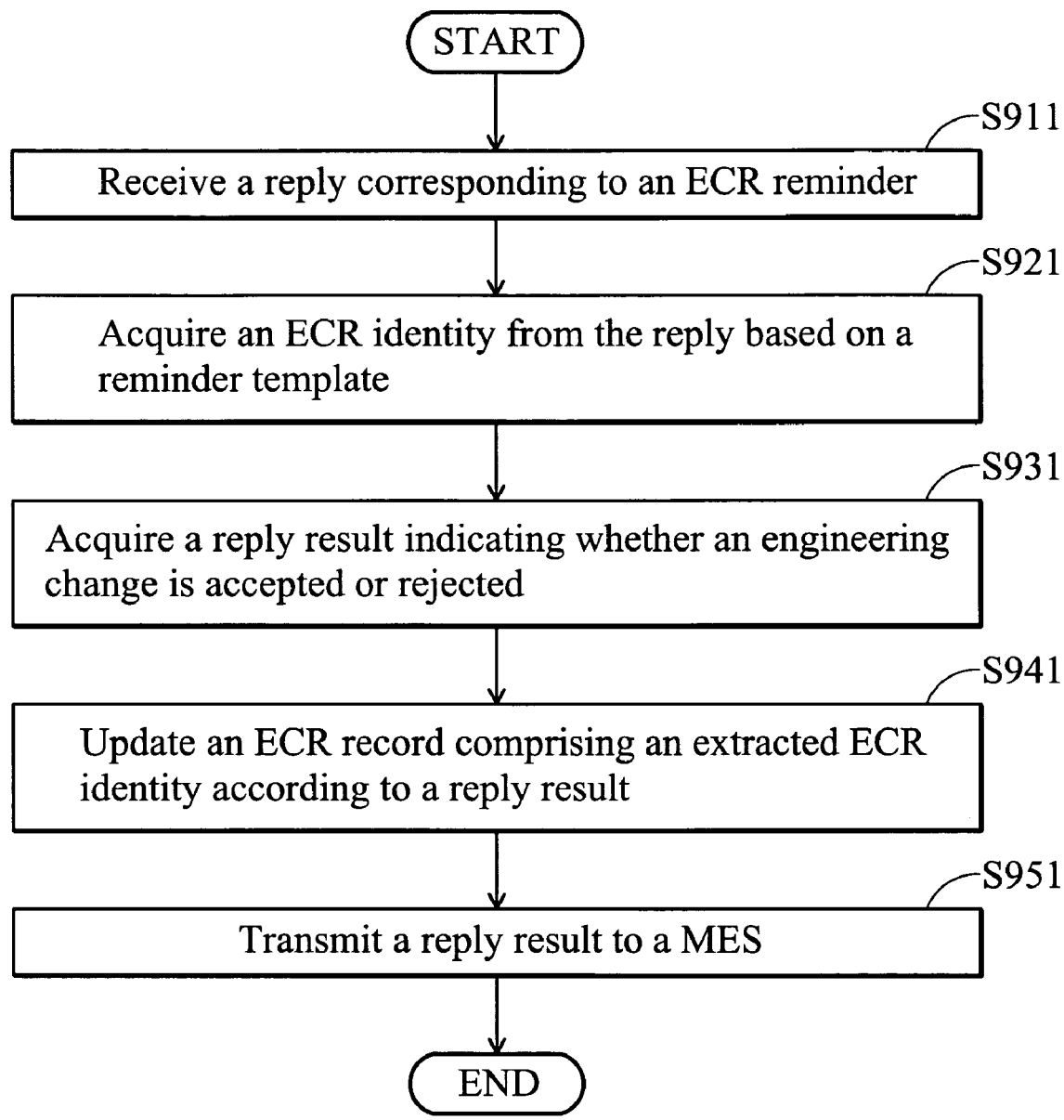
FIG. 9 is a flowchart showing an embodiment of a method for response verification.

The response verification module 23 may receive a reply corresponding to an ECR reminder, acquire a reply result indicating whether an engineering change is accepted or rejected, and transmit the reply result to a manufacturing execution system (MES). Response verification is executed by the response verification module 23. FIG. 9 is a flowchart showing an embodiment of a method for response verification. In step S911, a reply corresponding to an ECR reminder is received. In step S921, an ECR identity is acquired from the reply based on a reminder template. For example, the alphanumeric string following the sentence "ECR No.:" can be extracted as an ECR identity. In step S931, a reply result indicating whether an engineering change is accepted or rejected is acquired from the reply based on a reminder template. For example, the alphanumeric string following the query sentence "Do you agree to the change? (Y/N):" is extracted as a reply result. If the extracted alphanumeric string is "Y", "Yes" and the like, the reply result indicates the engineering change is accepted, and otherwise, if the extracted alphanumeric string is "N", "No" and the like, the reply result indicates engineering change is rejected. In step S941, a response status is made in an ECR record comprising the ECR identity according to the reply result. The response status in an ECR record may be updated by issuing one or more ANSI SQL queries to a database management system, executing data object methods or file manipulation instructions. In step S951, the reply result is transmitted to a manufacturing execution system (MES, not shown).

The MES (not shown) may be an integrated computer system representing the methods and tools used to accomplish production. Examples of the MES (not shown) include Promis (Brooks Automation Inc. of Massachusetts), Workstream (Applied Materials, Inc. of California), Poseidon (IBM Corporation of New York), and Mirl-MES (Mechanical Industry Research Laboratories of Taiwan). Each MES may have a different application. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. Thus, the MES (not shown) directs one or more fabrication tools to apply new engineering on corresponding wafer lots if the received reply result indicates the engineering change is accepted by a client operator.

Figure 10:
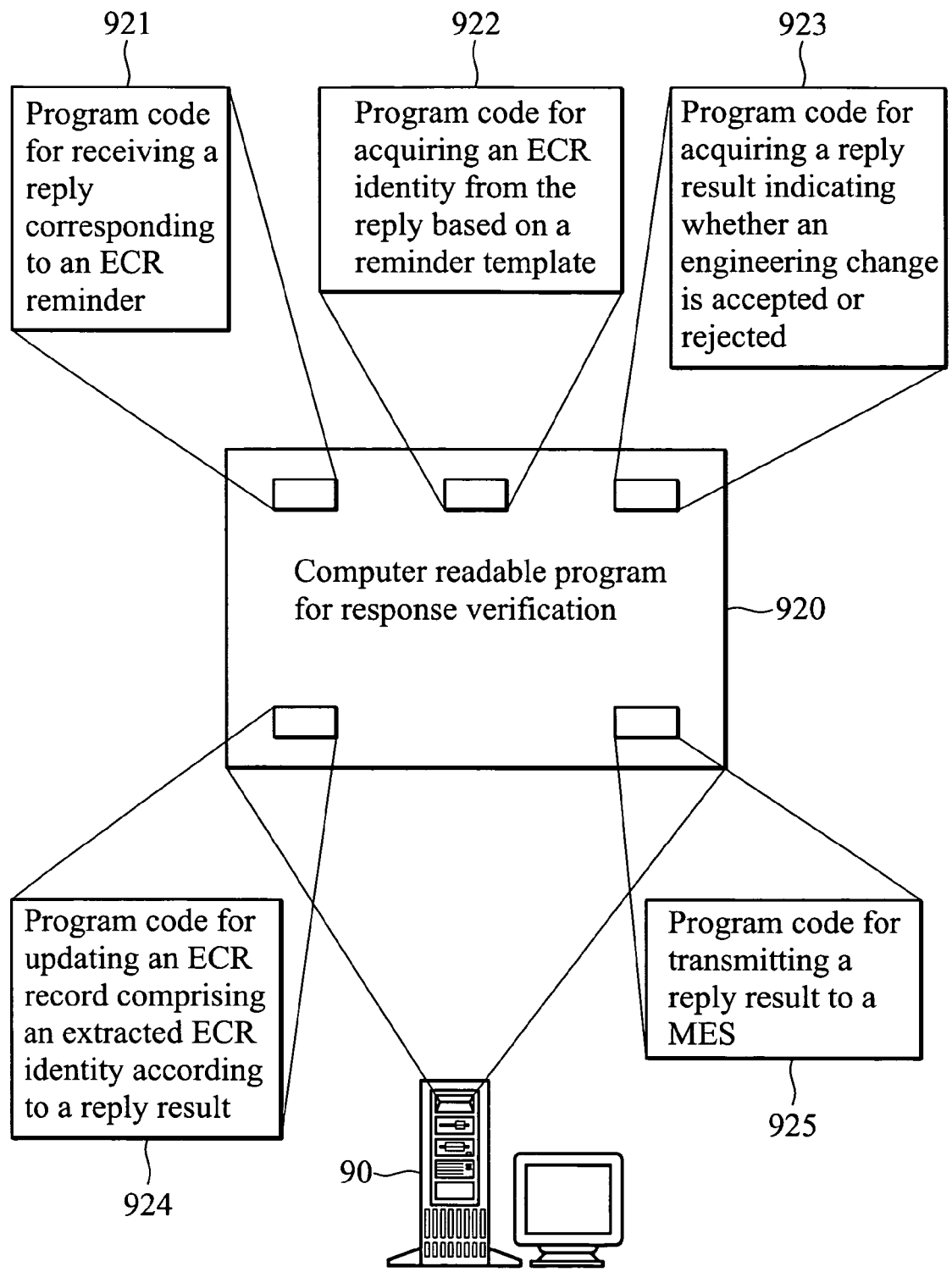
FIG. 10 is a diagram of a storage medium storing a computer program providing an embodiment of a method of response verification.

Also provided is a storage medium as shown in FIG. 10 storing a computer program 920 executing methods of response verification. The computer program product includes a storage medium 90 having computer readable program code therein, the computer readable program code comprising at least computer readable program code 921 receiving a reply corresponding to an ECR reminder, computer readable program code 922 acquiring an ECR identity from the reply based on a reminder template, computer readable program code 923 acquiring a reply result indicating whether engineering change is accepted or rejected, computer readable program code 924 updating an ECR record comprising an extracted ECR identity according to a reply result, and computer readable program code 925 transmitting a reply result to a MES.

Figure 11:
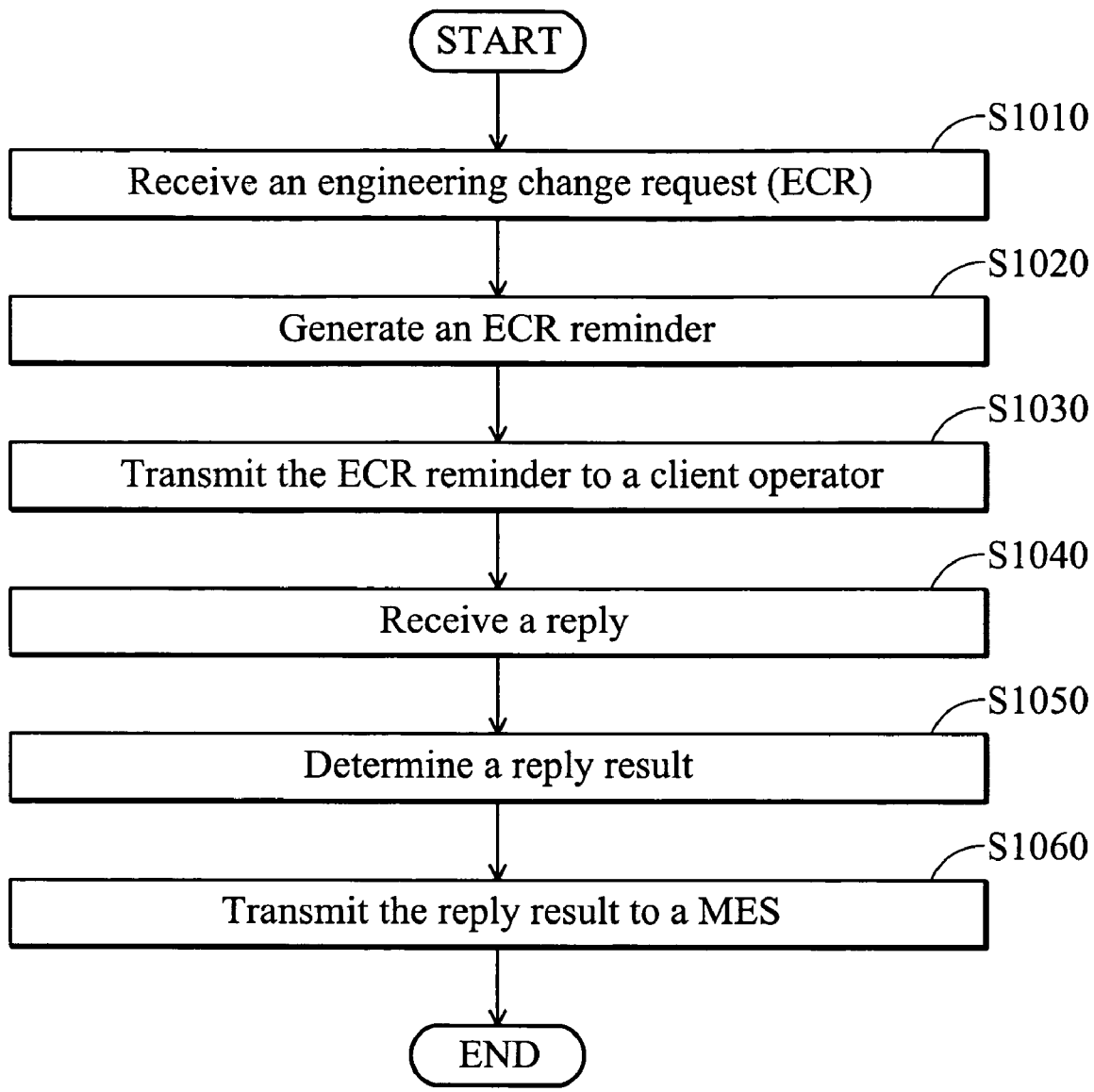
FIG. 11 is a flowchart of an embodiment of a method for fabrication management.

Fabrication management is performed by the notification control module 22 and response verification module 23. FIG. 11 is a flowchart showing an embodiment of a method for fabrication management. In step S1010, an engineering change request (ECR) comprising information regarding new engineering for a wafer lot is received. In step S1020, an ECR reminder comprising information regarding the ECR request is generated. In step S1030, the ECR reminder is transmitted to a client operator through a communication device. In step S1040, a reply corresponding to the ECR reminder is received. In step S1050, a reply result indicating whether the ECR is accept is determined by detecting the reply. In step S1060, the reply result is transmitted to a manufacturing execution system (MES), thereby enabling the MES to direct at least one fabrication tool to apply the new engineering on the wafer lot. Fabrication of at least one semiconductor device in a wafer lot utilizes the disclosed method.

Fabrication management systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The disclosed methods and systems may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described in terms of preferred embodiment, it is not intended to limit the invention thereto. Those skilled in this technology can make various alterations and modifications without departing from the scope and spirit of the invention. Therefore, the scope of the invention shall be defined and protected by the following claims and their equivalents.

What is claimed is:

1. A system for fabrication management, comprising:
    a communication device;
    a processing unit receiving engineering change request (ECR) comprising information regarding new engineering for a wafer lot, generating an ECR reminder comprising information regarding the ECR request, transmitting the ECR reminder to a client operator through the communication device, receiving a reply corresponding to the ECR reminder, determining a reply result indicating whether the ECR is accepted by detecting the reply, and transmitting the reply result to a manufacturing execution system (MES), thereby enabling the MES to direct at least one fabrication tool to apply the new engineering on the wafer lot; and
    a storage device storing a reminder template,
    wherein the ECR reminder is generated based on the reminder template, and the reply result is acquired based on the reminder template.

2. The system of claim 1 wherein the processing unit farther generates an ECR record comprising a response status indicating the ECR is not replied to, a due date, and a valid condition indicating the ECR is accepted if this time exceeds the due date and the ECR is not replied to, and stores the ECR record to the storage device.

3. The system of claim 2 wherein the processing unit further generates an engineering change notice comprising information regarding the ECR after detecting the ECR record, and transmits the engineering change notice to the client operator through the communication device.

4. The system of claim 3 wherein the storage device stores an engineering change notice template.

5. The system of claim 4 wherein the engineering change notice is generated based on the engineering change notice template.

6. The system of claim 1 wherein the processing unit further generates an ECR record comprising response status indicating the ECR is not replied to, and stores the ECR record in the storage device.

7. The system of claim 6 wherein the ECR reminder is generated after detecting the ECR record.

8. The system of claim 7 wherein the storage device stores a reminder template, the ECR reminder is generated based on the reminder template, and the reply result is acquired based on the reminder template.

9. A method for fabrication management using a computer, comprising:
    receiving an engineering change request (ECR) comprising information regarding new engineering for a wafer lot;
    generating an ECR reminder comprising information regarding the ECR request;
    transmitting the ECR reminder to a client operator through a communication device;
    receiving a reply corresponding to the ECR reminder;
    determining a reply result indicating whether the ECR is accepted by detecting the reply; and
    transmitting the reply result to a manufacturing execution system (MES), thereby enabling the MES to direct at least one fabrication tool to apply the new engineering on the wafer lot,
    wherein the ECR reminder is generated based on a reminder template in a storage device, and the reply result is acquired based on the reminder template.

10. The method of claim 9 further comprising:
    generating an ECR record comprising a response status indicating the ECR is not replied to, a due date, and a valid condition indicating the ECR is accepted if this time exceeds the due date and the ECR is not replied to; and
    storing the ECR record to a storage device.

11. The method of claim 10 further comprising:
    generating an engineering change notice comprising information regarding the ECR after detecting the ECR record; and
    transmitting the engineering change notice to the client operator through the communication device.

12. The method of claim 11 wherein the engineering change notice is generated based on an engineering change notice template in the storage device.

13. The method of claim 9 further comprising:
    generating an ECR record comprising response status indicating the ECR is not replied to; and
    storing the ECR record in a storage device.

14. The method of claim 13 wherein the ECR reminder is generated after detecting the ECR record.

15. The method of claim 14 wherein the ECR reminder is generated based on a reminder template in the storage device, and the reply result is acquired based on the reminder template.

16. A semiconductor device in a wafer lot, fabricated by a method comprising:
    receiving an engineering change request (ECR) comprising information regarding a new engineering for the wafer lot;
    generating an ECR reminder comprising information regarding the ECR request;

transmitting the ECR reminder to a client operator through a communication device;
receiving a reply corresponding to the ECR reminder;
determining a reply result indicating whether the ECR is accept by detecting the reply; and
transmitting the reply result to a manufacturing execution system (MES), thereby enabling the MES to direct at least one fabrication tool to apply the new engineering on the wafer lot,
wherein the ECR reminder is generated based on a reminder template in a storage device, and the reply result is acquired based on the reminder template.

* * * * *